United States Patent Office 3,133,134
Patented May 12, 1964

3,133,134
PROCESS FOR THE PRODUCTION OF ARTICLES OF CERAMIC WARE FROM MAGNESIUM OXIDE
William George Garrett, Ringwood, Victoria, and Lloyd Stuart Williams, East Hawthorn, Victoria, Australia, assignors to Commonwealth Scientific and Industrial Research Organization, East Melbourne, Victoria, Australia, a body corporate
No Drawing. Filed Jan. 30, 1961, Ser. No. 85,479
15 Claims. (Cl. 264—86)

This invention relates to the production of ceramic articles and is directed particularly, but not exclusively to the technique of slip-casting, wherein magnesium oxide suspensions are used in the fabrication of ceramic articles.

Slip-casting is a well known technique in which a suspension or slip of powdered solid material in a liquid vehicle, generally aqueous, is poured into a porous mould of suitable internal shape, usually made from plaster of Paris, the liquid being absorbed by the plaster to leave a firm cast of the solid particles from the slip compacted against the internal surface of the plaster mould.

Aqueous slip-casing techniques are applicable in principle to the fabrication of ceramic and refractory articles consisting largely of magnesium oxide, but the preparation of satisfactory aqueous slips for this purpose has been regarded in the past as exceedingly difficult. It has been suggested (National Bureau of Standards, Journal of Research, "The Preparation of Crucibles from Special Refractories by Slip-Casting," Thompson and Mallett, vol. 23, August, 1939, page 325) that magnesium oxide shapes can only be slip-cast from a suspension of the oxide in water-free ethyl alcohol, but in our experience this method is uneconomic, and the resultant casts are relatively weak and show a marked tendency to adhere to the moulds.

More recently it has been shown (U.S. Patent No. 2,902,380 of Allison, 1959) that satisfactory casts may be made from an aqueous slip of magnesium oxide prepared according to a very precise schedule involving wet-grinding, aging, and the addition of hydrochloric acid. The method is time-consuming and exacting and a more rapid, flexible versatile method of preparation of magnesia slips of adequate stability in storage and during a conveniently long working period would appear to be desirable.

The principal object of the present invention is to provide an improved process for the production of ceramic articles from magnesium oxide.

A more particular object is to provide a method for the rapid preparation of aqueous slips of magnesium oxide of various desired blends and proportions of particle sizes which will pour freely from a container into plaster moulds of the type used in the process of slip-casing and will cast at convenient rates.

A further object of the invention is to permit the incorporation of a relatively large proportion of particulate magnesium oxide in a suspending aqueous vehicle whilst still permitting the resultant slip to pour freely and cast at a convenient rate.

A further object is to provide a method of preparing aqueous slips of magnesium oxide from which satisfactory cast articles can be produced, particularly with respect to the development of relatively high strength during casting and drying.

A further object is to provide a method of preparing aqueous magnesium oxide slips which may be used during a conveniently long working period or be stored for periods of at least 8 hours without a change in pouring and casting characteristics becoming apparent.

The above objects are achieved in accordance with the invention by means of a preparation process in which magnesium oxide is dry-milled to a powder of suitable fineness in a sealed container which prevents access of the carbon dioxide of the natural atmosphere to the fresh surfaces of the oxide, preferably with the addition of a small amount of an agent which nullifies the deleterious action of any such carbon dioxide to which the powder may be subsequently exposed, the milled powder then being incorporated in a water solution of an agent which gives both a high degree of dispersion of the magnesium oxide powder in the liquid vehicle (and hence a high degree of fluidity of the resultant slip) and contributes strength to the cast products in both the as-cast and air dried conditions, while allowing an adequate working period and, in the case of certain preferred additions, a useful storage period without appreciable deterioration.

Although the following description will be directed particularly to the application of the invention to slip-casting techniques it is to be understood that the invention is applicable also to other techniques for the formation of ceramic articles from magnesium oxide.

In a typical preparation according to the invention, magnesium oxide of the desired degree of purity, generally 97% or better, either granular fused material or the calcined oxide or any desired mixture of the two, is dry-milled in a sealed container such as a ball or jar mill until the desired range of particle sizes and degree of homogeneity of the powder charge is attained. Alternatively, the fused and calcined powders may be prepared separately and blended during the subsequent process of preparing the slip. Coarser-grained magnesium oxide may also be introduced at this stage, depending on the type of article being cast; fine magnesium oxide powders are generally preferred for small items of laboratory ware such as crucibles for which the attainment of low or negligible open porosities during firing is usually more important than limitation of shrinkage, but in the case of large magnesium oxide articles for metallurgical or general refractory uses it may be more important to limit the shrinkage occurring on casting and during firing, in order to maintain dimensional tolerances or to avoid distortion and cracking or particularly massive or complicated shapes, and to this end the incorporation of a proportion of coarser-grained magnesium oxide in the slip is often advantageous. It is to be understood therefore that the term "powder" as used herein is meant to include such coarser-grained material.

As a safeguard against the deleterious effects of carbon dioxide present in the air originally enclosed in the sealed mill or which may gain access to the slip components during subsequent handling, an amount of acetic anhydride in the range from 0.1 to 1.0% by weight of the magnesium oxide mill charge may be added at the start of milling or shaken into the milled product before storage if the powder is not to be used immediately.

At the conclusion of the period of milling, the powder is either stored in air-tight containers until required or transferred from the mill to a mixer in which it is incorporated into a slip by addition or incorporation of a suitable amount of an aqueous solution of magnesium citrate or phthalate, the concentration of this solution being in the range 0.1 to 10% by weight, and the amount added being sufficient to give a slip containing between 60% and 85% by weight of the milled magnesium oxide powder or powders, including coarser-grained additions if desired. Although weight proportions are more convenient to deal with in practice, it should be noted that a truer and more favourable indication of the effectiveness of the magnesium salts in increasing the proportion of magnesium oxide in the slip is given by expressing slip compositions in terms of volume proportions, because the density of the liquid vehicle is increased by having the magnesium salt in solution, and hence the volume of a given weight of vehicle is reduced. Further decomposition of the magnesium salt during firing of the slip-cast articles produces additional magnesium oxide in situ. The mixing period may be from 5 to 30 minutes in duration, and this operation is conducted substantially in the absence of atmospheric carbon dioxide, the mixer being sealed as far as possible against the entry of air. Transfer of the powder from the mill to the mixer and the subsequent transfer of the slip from the mixer to a storage vessel (if the slip is not required for immediate use) is also conducted as far as is practicable with exclusion of air or carbon dioxide. During the mixing stage, approximately 0.1% of octanol, based on the total weight of the slip, may be added to ensure that frothing due to the incorporation of air bubbles into the slip is reduced to a minimum; the octanol addition was used in all the examples hereinafter cited. Before using the slip, any entrained air may be expelled by customary expedients such as gently agitating the slip by stirring or swilling, vibrating the slip container, and exposing the slip to the normal run of works vacuum for a short period. It is to be understood that the properties of the aqueous magnesia slips prepared as described above may possibly be further improved in some cases by the addition of small amounts of established dispersing agents such as "Calgon" (registered trademark), but it will be clearly demonstrated by the examples hereinafter cited that very satisfactory slips can be prepared according to the process of the present invention without such additions. After preparation as described above, the slip is ready for immediate use, or in certain cases included in the examples hereinafter given, may be stored for at least 8 hours in a vessel sealed against entry of gases and withdrawn as required for casting.

It is desirable to agitate the slip gently at frequent intervals, or continuously if convenient, during the period of storage, more particularly if higher magnesium oxide contents and more concentrated solutions of the preferred additions are used.

The principles upon which this method of preparation is based include two which are completely novel and are particularly applicable to the system comprising magnesium oxide suspended in an aqueous medium.

These are: (a) The exclusion of carbon dioxide from the system; (b) The use of the magnesium salt of a polybasic organic acid as an additive.

Before presenting particular examples embodying the basic principles of the invention and the preparation procedure given above, certain further points of preparation and procedure common to the various examples and relating to the production of satisfactory magnesium oxide articles from slips prepared by the processes of the invention will now be described.

(i) The magnesium oxide powder used as the basis for most of the examples to be cited will be referred to hereinafter as "standard magnesium oxide" or "standard magnesium oxide powder." This powder was prepared in the following way:

A typical electrically fused commercial magnesium oxide (Thermal Syndicate Ltd. Grade 1), containing approximately 97.5% by weight of the pure oxide and 2.5% by weight of impurities mainly silica, lime, and a little iron oxide and having a particle size range substantially between 0.5 mm. and 0.03 mm., was ground dry with steel balls in a sealed compressed-rubber ball mill for 12 hours, then used immediately for slip preparation or transferred to air-tight containers with minimum exposure to the atmosphere. The peak in the particle size distribution curve for the ball-milled powder was around 2 microns and 99% of the particles were below 10 microns. Unless otherwise stated, acetic anhydride was not added to the standard magnesium oxide powder during grinding or before storage, in order that the merits of the slips prepared according to the processes of the invention could be demonstrated without the possible complication of an additional chemical factor.

(ii) Viscosities were determined for aqueous magnesium oxide slips prepared by the processes of the invention from standard magnesium oxide, of various weight proportions such that the variation in pouring and casting properties with increasing magnesium oxide contents could be studied. The viscosities were measured by a model LVT Brookfield viscometer with a No. 2 spindle run at 30 r.p.m. at 20° C. (room temperature). As a general rule for the standard magnesium oxide slips, viscosities in the range 500 to 1500 centipoises were found to be satisfactory, having regard to the desirability of relatively high magnesia contents, but it is to be understood that the satisfactory range may vary to some extent with the composition of the liquid vehicle of the slip; further, it is to be understood that the satisfactory range may vary if appreciably finer or coarser powders than the standard magnesium oxide are used in the slip, or if a proportion of relatively coarse-grained magnesium oxide is added. At the higher end of the satisfactory range of viscosity, further small increases in the magnesium oxide content cause disproportionately large increases in viscosity, and the extreme limit of useful pourability of approximately 2000 centipoises is readily exceeded. Slips having viscosities of the order of 2000 centipoises usually exhibit thixotropic behaviour and necessitate vibration of the slip container while pouring, and although they may be used in some cases for casting solid articles, they are not recommended for general use.

(iii) It was found that the casting and extraction of a small, thin-walled crucible constituted a searching test of the overall properties of aqueous slips containing standard magnesium oxide or other fine magnesium oxide powders suitable for the fabrication of small, thin-walled articles which are required to have low or negligible open porosities when fired. The standard mould for this purpose produced a tapered crucible-shaped cast 1⅜ inches deep, with a rim diameter of 1⅛ inches and a base diameter of 1 inch. Unless otherwise stated in the examples, the articles cast were crucibles of these dimensions.

(iv) Mould-release problems may be encountered with small, thin-walled casts of this type if the proportion of very fine particles in the slip is high (resulting in "keying" into the pores of the plaster mould), if the green strength of the casts is relatively low (as with plain water slips), if a particularly thin-walled cast is required (e.g. less than 1 mm.), or if the casting surfaces of the moulds are roughened or damaged, or not free from the residues of previous castings. In such cases it is advantageous to prepare the moulds by lining with a friable coating of a suitable particulate material to facilitate extraction of the casts without damage. These linings may be applied by deposition from thin suspensions in a suitable liquid vehicle, which may be industrial ethanol, or water containing a little "Calgon" (registered trademark) to assist dispersion; some suitable powders are "heavy" chemical magnesia, damourite, and diatomite. Ethanol is generally preferred as the liquid vehicle for these lining "washes" by virtue of the uniformity and readily controlled thickness of the linings produced, and the rapidity of drying. Linings applied by dusting are often adequate, particularly if "heavy" chemical magnesia powder is used.

With most of the preferred slip compositions cited in the examples, mould-release of the standard small crucible is not a major problem provided the moulds are clean and in good condition. However, in cases where mould linings are not essential it may still be desirable to use them to ensure the highest yields of undamaged casts and to increase the life of the moulds.

In the case of large magnesium oxide products for metallurgical or general refractory uses it can be important to limit casting and firing shrinkages in order to maintain dimensional tolerances, or to avoid distortion and cracking of particularly massive or complicated shapes, and accordingly appreciable quantities of relatively coarse-grained magnesium oxide may be introduced into the casting slips. With relatively large and massive slip-cast articles, particularly when coarser-grained magnesium oxide is incorporated, mould-release difficulties are seldom encountered, and a dusting of "heavy" chemical magnesium oxide should be adequate to meet any special problems, such as the extraction of complicated shapes.

(v) After casting in the plain or lined plaster moulds, it is usually sufficient to allow a period of from 5 to 30 minutes before extracting the cast articles, the time allowed depending on such factors as size, shape and thickness, and the magnesium oxide aggregate used in the slip. Articles produced from slips prepared according to the processes of the invention have ample strength to permit trimming operations to be carried out in the "green" state with reasonable care in handling, and in the course of natural drying they develop relatively high strengths, such that in the fully dried condition the use of hardened tools such as files, hacksaws and scrapers may be required to carry out shaping and trimming operations. In general, the slips prepared with the finer magnesium oxide aggregates appropriate to a particular size of product tend to yield the higher-strength dried casts.

(vi) After drying, the magnesium oxide products are fired in a suitable furnace, which may be initially at a temperature of the order of 800 to 1000° C. provided the ware is introduced slowly enough to avoid excessive thermal stresses and to permit the evolution of small quantities of decomposition products without damage.

The effect of carbon dioxide as a deleterious factor which greatly increases the viscosity of aqueous magnesium oxide slips may be illustrated by the following experiments:

*Example 1*

Freshly ground standard magnesium oxide powder was made up with distilled water into a slip containing 71% by weight of solids by mixing for 10 minutes in a sealed jar mill of the planetary type, which gave rapid and efficient mixing in this short period with negligible further reduction in the particle size of the magnesium oxide.

The slip so prepared could be poured freely, when freshly made, into plaster moulds, where it cast fairly rapidly into relatively thick-walled articles of low mechanical strength. These casts showed a tendency to crack during initial drying in the moulds, even when the moulds were lined as described earlier.

A second batch of slip was prepared to show the effect of surface hydration of magnesium oxide. A sample of the standard magnesium oxide powder was exposed for 24 hours to a stream of air which had been passed through sodium hydroxide solution to remove carbon dioxide, then through an ammonium sulphate solution to bring the relative humidity to approximately 80%. The powder was made up into a slip containing 71% solids by weight, using 10 minutes mixing as before, and was found to be no more viscous than the first slip, made from freshly-milled magnesium oxide powder.

A third batch of slip, at the same solids content and mixed in the same way, was made from standard magnesium oxide powder which had been exposed to dry carbon dioxide gas for 24 hours. This slip was too viscous to be poured successfully.

A fourth slip prepared from standard powder which had been exposed to moist carbon dioxide for 24 hours was even more viscous at the same solids content, having the consistency of a paste.

Further samples of standard magnesium oxide powder, exposed to room air in the temperature range 18°–20° C. at relative humidities between 40% and 80%, all showed the deleterious effects of carbon dioxide absorption on the viscosity of the slips into which they were made. A few hours exposure caused a noticeable rise in slip viscosity. Powders exposed to air for more than 12 hours could not be made up into slips which could be used for casting at a solids content of 71% by weight.

Further samples of freshly ground standard magnesium oxide were taken and thoroughly mixed by shaking, or light milling, with various amounts of acetic anhydride, before exposure to air or carbon dioxide. When 0.1% or more by weight of the anhydride was added to the magnesium oxide, the powders could be exposed for days without exhibiting the degree of thickening observed with similarly exposed unprotected powder when made up into slips containing 71% solids by weight. It was found that the anhydride addition could be made at any stage of grinding of the magnesium oxide, or immediately before storage of the freshly ground powder, with beneficial results on the characteristics of plain water slips subsequently prepared from the oxide. Improvements noted by comparison with standard untreated magnesium oxide included: (i) an increase of about 1% by weight in the solids content of slips made from standard magnesium oxide treated with the anhydride, i.e. 72% compared with 71% for untreated powder, without increasing the slip viscosity; (ii) a lower rate of casting, permitting the casting of moderately thin-walled shapes; (iii) higher as-cast strengths and a reduced tendency to crack, so that sound casts could be obtained regularly from line moulds; and (iv) a relatively long working period and storage life, at least 8 hours in the latter case.

The action of the anhydride is purely protective, however, no beneficial effect following its addition to a standard magnesium oxide powder which had already been exposed to carbon dioxide. The mechanism of the protective action is not known, but may be due to the simple blocking effect of the anhydride molecules chemisorbed at the surface of the oxide particles, so preventing adsorption of carbon dioxide.

The following examples illustrate the action of the second major principle involved in this invention, the effect of certain salts on the viscosity of magnesium oxide slips. The main effects produced are the lowering of the viscosity of any slip of given solids content, or conversely, maintenance of a given slip viscosity with increased solids contents, and the strengthening of cast articles in the as-cast and air-dried conditions. Subsidiary effects, beneficial to the slip-casting process, include a measure of control over the casting rate, suppression of the tendency for casts to crack during initial drying in the moulds, improved mould-release, and, in certain cases, adequate stability to permit storage in air-tight vessels for at least 8 hours before use.

The mechanism of the action of the salts used is obscure, but may be connected with a common-ion effect. It is apparently not simple deflocculation of a positively charged suspensoid by cations in the liquid phase, as the nature of the anion is critical. It has been found that magnesium salts of divalent acids such as magnesium sulphate are more effective in reducing slip viscosity than salts of monovalent acids such as magnesium nitrate and chloride. It has also been found that salts of weaker acids are more effective than those of stronger acids, thus magnesium phthalate is more effective than magnesium sulphate.

The following examples illustrate the principle as applied in accordance with the present invention. The magnesium salts used were selected from the group of salts of the polybasic acids including phthalic acid (Example 2), citric acid (Example 3) and tartaric acid. The salt of the tri-basic citric acid is shown to be slightly more effective than that of the di-basic phthalic acid in reducing viscosity and both of these salts of weak organic acids are shown to be more effective than the salt of sulphuric acid. Magnesium tartrate is not illustrated, since although the tartrate anion is comparable to phthalate and citrate in respect to reduction of slip viscosity, the slips so prepared do not retain the low viscosity characteristic for as long a period as those containing phthalate or citrate.

Example 2

To illustrate the effect of additions of a magnesium salt of a di-basic organic acid, samples of standard magnesium oxide powder were made up into slips with aqueous solutions containing 3%, 5% and 10% by weight of magnesium phthalate by blending in a large rotating jar mixer of square cross-section for 15 minutes. Various proportions of the oxide were incorporated into slip batches made with each solution concentration of the magnesium phthalate to permit the determination of the maximum solids content which could be attained before the slip viscosity was increased above the useful range.

A slip prepared with a 3 wt. percent of solution of magnesium phthalate poured freely and cast satisfactorily at 72% solids by weight, compared with 71% for a plain water slip. This moderate increase in the proportion of solids in a slip is important in slip-casting, giving a more even, well compacted cast, with improved mould-release and strength properties.

Further batches of slip were prepared with 5 wt. percent and 10 wt. percent solutions of magnesium phthalate and it was found that the proportions of solids could be increased to limits of 73 wt. percent for the slip made with the 5 wt. percent solution and 74 wt. percent for the slip made with the 10 wt. percent solution, while maintaining the slip viscosity within the satisfactory range. A variety of articles cast from such slips were very true to shape, were well compacted and relatively strong in the as-cast condition, did not crack during initial drying in the moulds, could be extracted from the moulds relatively easily, and developed high strengths during air-drying. Crucibles up to one liter capacity were cast, including small crucibles having a wall thickness no greater than 1mm., which could be handled out of the moulds, trimmed, and placed on drying racks without extreme care being necessitated. In subsequent firing processes, the crucibles retained the desired shapes without distortion, and attained a satisfactory fired density for refractory magnesium oxide ware.

Further slips prepared with magnesium phthalate solutions in excess of 10% by weight showed no improvement in fluidity or casting characteristics. At a magnesium phthalate content of 20%, some increase in viscosity was in fact apparent for slips containing the critical limiting proportion of 74% of our standard magnesium oxide powder.

The preferred range of solution concentrations for magnesium phthalate additions to slips prepared from standard magnesium oxide power is therefore from 3% to 10% by weight. A special advantage of this additive is the strength conferred on casts in both the as-cast and air-dried conditions. The fact that some additional magnesium oxide, produced during the decomposition of residual magnesium phthalate in the firing of the casts, remains in the finished ware, is an added advantage, tending to increase the fired density of the ware.

Slips prepared with magnesium phthalate solutions from standard magnesium oxide powder which had been protected with 0.1 wt. percent to 1.0 wt. percent of acetic anhydride as described earlier showed no detectable differences in characteristics from the corresponding slips mentioned above in this example, which were prepared from the standard powder kept out of contact with carbon dioxide as far as practicable, but without the addition of acetic anhydride.

Standard magnesium oxide samples which has deteriorated due to exposure to air or carbon dioxide could not be made up into acceptable slips with plain water, but could be made up into satisfactory slips with the more concentrated magnesium phthalate solutions, though at lower solids contents. Such slips containing the phthalate showed much better characteristics than the corresponding slips made from pure water and acceptable cast ware could be produced from these slips. However, for optimum casting results it is apparent that the criteria of exclusion of carbon dioxide and the use of a suitable salt such as magnesium phthalate must both be fulfilled.

Example 3

To illustrate the effect of using the magnesium salt of a polybasic acid of still higher valency, namely tribasic citric acid, as an additive to reduce the slip viscosity or to increase the solids content for a given viscosity, batches of slip corresponding to those referred to in Example 2 were prepared, but using magnesium citrate instead of magnesium phthalate.

The limiting proportions of standard magnesium oxide powder that could be incorporated in these slips without exceeding the acceptable level of viscosity were slightly higher than the values determined using magnesium phthalate as the dispersing additive. With 10 wt. percent and 5 wt. percent solutions of the citrate the limiting proportions of solids were 74.5% and 74% respectively, by weight of the slips. Even with a 1 wt. percent solution of magnesium citrate an acceptable slip could be prepared at 73 wt. percent solids. As with the phthalate, no improvements in slip characteristics were observed when the concentration of the citrate exceeded 10 wt. percent, so that the useful range for the citrate solutions appears to lie between 0.1% and 10% by weight, the solution concentration used within the preferred range being less critical than in the case of the phthalate. Equivalent strength solutions of citric acid were used instead of magnesium citrate in a parallel series of cases and substantially identical results were obtained.

All slips prepared with magnesium citrate cast well, giving a range of articles of excellent shape, soundness and strength. Particular advantages of the citrate as an additive are that it is somewhat more effective than the phthalate in reducing viscosity, and that the slips containing it may be stored for longer periods without becoming too thixotropic for use.

Example 4

To illustrate the use of additions of magnesium salts of poly-basic organic acids in preparing slips incorporating very fine magnesium oxide powders, a range of slips was made up with aqueous solutions of magnesium phthalate and magnesium citrate. Plain water slips incorporating very fine magnesium oxide invariably suffer from one or more of the following disadvantages: very low solids contents for acceptable slip viscosities, high casting rates giving poor control over wall thickness, a marked tendency to crack during initial drying in the moulds, and poor mould-release properties.

The magnesium oxide powder used for most of the slips of this Example was milled from the same starting material as the standard magnesium oxide powder and was prepared and handled with the same precautions to avoid access of atmospheric carbon dioxide as far as possible, the only essential difference being the increased grinding time of 48 hours, resulting in the production of a larger proportion of very fine particles and a shift of the particle size distribution peak from 2 microns to 1 micron. With both freshly ground powder and powder which had been stored in air-tight vessels for more than a year, satisfactory slips were prepared at 68 wt. percent solids content with either 3 wt. percent phthalate solution or 1 wt. percent citrate solution, and the solids content was increased to 70 wt. percent when a 10 wt. percent of either the phthalate or the citrate was used as the aqueous vehicle. These slips cast at convenient rates giving satisfactory control over wall thickness, and the cracking and mould-release problems were largely eliminated, particularly with the more concentrated magnesium salt solutions as the slip vehicle. However, for highest yields of undamaged casts from slips prepared with such a fine powder, the use of mould linings is recommended.

The particular effectiveness of magnesium citrate in facilitating slip-dispersion is illustrated by the fact that a sample of the same very fine magnesium oxide, which had deteriorated by interaction with atmospheric carbon dioxide and would normally be regarded as unsatisfactory for use in aqueous slips, was nevertheless made up into a useful slip of 67 wt percent solids contents with a 10 wt. percent solution of magnesium citrate. However, the deleterious effect of exposure to atmospheric carbon dioxide is again apparent from the fact that the solids content had to be reduced from 70 wt. percent to 67 wt. percent to give a slip of acceptable viscosity, and the fact that magnesium phthalate addition failed to yield a satisfactory slip in this case.

As a further instance of the use of the above-mentioned magnesium salts to permit the incorporation of very fine magnesium oxide powders, slips were prepared with aqueous solutions of these salts, in which 20% of the weight of magnesium oxide used consisted of lightly calcined (1200° C.) chemical magnesium oxide of fineness comparable with that of fused magnesium oxide ground for 48 hours, the remainder of the magnesium oxide being the standard powder. Satisfactory slips were prepared at 65 wt. percent solids content with a 10 wt. percent magnesium citrate solution, and at 63 wt. percent solids content with a 10 wt. percent magnesium phthalate solution; mould linings are recommended with these slips. Plain water slips of similar solids contents were too thick to pour and cast satisfactorily.

*Example 5*

As explained earlier in this specification, it is desirable in some cases to incorporate relatively coarse magnesium oxide grain as a proportion of the solids content of the slip. Accordingly, a range of slips was prepared in large batch quantities in which the magnesium oxide dispersed in the slip consisted of the standard powder with additions of coarser-grained fractions sieved from the as-supplied fused magnesium oxide.

In one such case, 20 wt. percent of the magnesium oxide portion of the slip consisted of a coarser fraction sieved through 150 mesh B.S.S. and retained on 300 mesh B.S.S. A satisfactory slip was prepared by dispersing 75 wt. percent of this magnesium oxide mixture in a 10 wt. percent solution of magnesium phthalate, mixing being carried out for 30 minutes in the large jar mill mentioned in Example 2; the viscosity of this slip was within the acceptable range, and the casting behaviour of the slip and properties of the cast articles were satisfactory, a variety of sizes and shapes of articles being produced, including large, relatively thin-walled crucibles with capacities of one litre and above. Special features of the articles cast from this slip were easy release from the moulds, and relatively low casting and firing shrinkages. These features were common to the products from all the coarser-grained casting slips cited in this example, and these slips were generally found to be stable for longer storage periods than slips made from finer powders.

As a further illustration, a slip was prepared in which 40 wt. percent of the magnesium oxide portion consisted of the −150+300 mesh fraction referred to above, the aqueous vehicle being a 10 wt. percent solution of magnesium citrate. The slip viscosity was within the acceptable range at 76 wt. percent solids content and the casting behaviour of the slip and the properties of the cast ware were satisfactory. Another satisfactory slip was prepared at 77 wt. percent solids content using the magnesium citrate solution, in which 30 wt. percent of the magnesium oxide portion consisted of the −150+300 mesh fraction, and 10 wt. percent consisted of a further fraction obtained by sieving through 72 mesh B.S.S. and retrieving on 150 mesh B.S.S.

Finally, a satisfactory slip was prepared with a solids content of 79 wt. percent, in which 30 wt. percent of the magnesium oxide portion consisted of the −150+300 mesh fraction, and 20 wt. percent consisted of the −72+150 mesh fraction, the aqueous vehicle in this case being a 10 wt. percent solution of magnesium phthalate, which was found to impart the highest as-cast and air-dried strengths to articles cast from slips incorporating such large proportions of relatively coarse magnesium oxide.

*Example 6*

The purpose of this example is to show that a satisfactory balance can be achieved between (i) the striking improvements in slip characteristics, and in the properties of the cast products, made possible by the two basic principles of the invention, and (ii) the additional desirable slip property of stability during a reasonable period of storage. More specifically, instances of slips which may be stored in air-tight vessels for periods of the order of an 8-hour working day will be cited, such slips exhibiting no appreciable changes in pouring and casting properties during this period. It is preferable to arrange that the stored slip can be gently agitated continuously or at frequent intervals (e.g. by rotation of the storage vessel) to ensure that the slip is ready for use whenever required. The stabilities of aqueous magnesium oxide slips, prepared for the most part as described in Examples 1 to 5, were studied by storing samples of the slips in sealed jars contained in a large air-tight vessel, and withdrawing jars at regular intervals as required for testing, at the same time agitating the contents of the remaining jars by rolling in a standard way. It should be noted that the solids contents of the slips, and hence the initial slip viscosities also, were in all cases close to the upper limits, and it is to be expected that a reducton in the solid content in any given case would bring about an increase in storage life. Where storage life is the primary consideration it is to be understood that solutions of strength considerably less than those herein exemplified could be used with advantage.

The testing procedure outlined led to the recommendation of the following slips on the basis of a storage life of 8 hours or more:

(i) Plain water slips containing up to 72 wt. percent of standard magnesium oxide powder previously treated with 0.1 wt. percent or more of acetic anhydride during grinding or prior to storage.

(ii) Slips prepared by dispersing standard magnesium oxide powder in less-concentrated aqueous solutions of magnesium citrate (i.e. not exceeding 3% by weight) at solids contents up to 73 wt. percent.

(iii) Slips prepared by dispersing mixtures of standard magnesium oxide powder and relatively coarse-grained magnesium oxide in low to medium-strength aqueous solutions of magnesium citrate (i.e. not exceeding 5 wt. percent) or in low-strength aqueous solutions of magnesium phthalate (i.e. not exceeding 3 wt. percent), where the proportions of coarser-grained magnesium oxide expressed as weight percentages of the total amount of magnesium oxide do not exceed 40% of the −150+300 mesh (B.S.S.) fraction and 20% of the −72+150 mesh (B.S.S.) fraction, and the solids contents for typical slips are as follows: (a) 72.5 wt. percent of a mixture consisting of 80% of standard magnesium oxide and 20% of the −150+300 mesh fraction by weight, dispersed in a 3 wt. percent solution of magnesium phthalate, or 73.5 wt. percent of a similar mixture dispersed in a 5 wt. percent solution of magnesium citrate; (b) 73.5 wt. percent of a mixture consisting of 60% of standard magnesium oxide and 40% of the −150+300 mesh fraction by weight, dispersed in a 3 wt. percent solution of magnesium phthalate, or 74.5 wt. percent of a similar mixture dispersed in a 5 wt. percent solution of magnesium citrate; (c) 74 wt. percent of a mixture consisting of 60% of standard magnesium oxide, 30% of the −150+300 mesh fraction, and 10% of the −72+150 mesh fraction by weight, dispersed in a 3 wt. percent solution of magnesium phthalate, or 75.5 wt. percent of a similar mixture dispersed in a 5 wt. percent solution of magnesium citrate; and (d) 75 wt. percent of a mixture consisting of 50% of standard magnesium oxide, 30% of the −150+300 mesh fraction, and 20% of the −72+150 mesh fraction by weight, dispersed in a 3 wt. percent solution of magnesium phthalate, or 76.5 wt. percent of a similar mixture dispersed in a 5 wt. percent solution of magnesium citrate.

We claim:

1. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is maintained in a substantially carbon dioxide-free zone prior to the slip formation, whereby the magnesium oxide is protected from the action of carbon dioxide, and
   (b) said slip contains an aqueous solution of an anion of a polybasic organic acid, said solution containing said anion in an amount equivalent to 0.1 to 10% by weight of the magnesium compound of the anion.

2. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is treated with acetic anhydride prior to the slip formation, whereby the magnesium oxide is protected from the action of carbon dioxide, and
   (b) said slip contains an aqueous solution of an anion of a polybasic organic acid, said solution containing said anion in an amount equivalent to 0.1 to 10% by weight of the magnesium compound of the anion.

3. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is treated with acetic anhydride prior to the slip formation, whereby the magnesium oxide is protected from the action of carbon dioxide, and
   (b) said slip contains an aqueous solution of an anion selected from the group consisting of citrate, phthalate and tartrate, said solution containing said anion in an amount equivalent to 0.1 to 10% by weight of the magnesium compound of the anion.

4. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is ground in a sealed mill substantially free of carbon dioxide prior to the slip formation, whereby the magnesium oxide is protected from the action of carbon dioxide, and
   (b) said slip contains an aqueous solution of an anion of a polybasic organic acid, said solution containing said anion in an amount equivalent to 0.1 to 10% by weight of the magnesium compound of the anion.

5. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is maintained in a substantially carbon dioxide-free zone prior to the slip formation, whereby the magnesium oxide is protected from the action of carbon dioxide, and
   (b) said slip contains an aqueous solution of citrate anion, said solution containing said anion in an amount equivalent to 0.1 to 10% by weight of the magnesium compound of the anion.

6. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is ground in a sealed mill substantially free of carbon dioxide prior to the slip formation, whereby the magnesium oxide is protected from the action of carbon dioxide, and
   (b) said slip contains an aqueous solution of citrate anion, said solution containing said anion in an amount equivalent to 0.1 to 10% by weight of the magnesium compound of the anion.

7. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is maintained in a substantially carbon dioxide-free zone prior to the slip formation, whereby the magnesium oxide is protected from the action of carbon dioxide, and
   (b) said slip contains an aqueous solution of phthalate anion, said solution containing said anion in an amount equivalent to 0.1 to 10% by weight of the magnesium compound of the anion.

8. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is ground in a sealed mill substantially free of carbon dioxide prior to the slip formation, whereby the magnesium oxide is protected from the action of carbon dioxide, and
   (b) said slip contains an aqueous solution of phthalate anion, said solution containing said anion in an amount equivalent to 0.1 to 10% by weight of the magnesium compound of the anion.

9. In a process for making magnesium oxide refractory articles wherein a magnesium oxide slip is formed from ground magnesium oxide, cast in a porous mold, extracted from the mold, and subsequently fired, the improvement wherein
   (a) said magnesium oxide is maintained in a substantially carbon dioxide-free zone prior to the slip formation, whereby the magnesium oxide is protected from the action of carbon dioxide, and
   (b) said slip contains an aqueous solution of tartrate anion, said solution containing said anion in an amount equivalent to 0.1 to 10% by weight of the magnesium compound of the anion.

10. In a process for making magnesium oxide refractory articles wherein a magnesium oxide slip is formed from ground magnesium oxide, cast in a porous mold, extracted from the mold, and subsequently fired, the improvement wherein
    (a) said magnesium oxide is ground in a sealed mill substantially free of carbon dioxide prior to the slip formation, whereby the magnesium oxide is protected from the action of carbon dioxide, and
    (b) said slip contains an aqueous solution of tartrate anion, said solution containing said anion in an amount equivalent to 0.1 to 10% by weight of the magnesium compound of the anion.

11. In a process for making magnesium oxide refractory articles wherein a magnesium oxide slip is formed from ground magnesium oxide, cast in a porous mold, extracted from the mold, and subsequently fired, the improvement wherein
    (a) said magnesium oxide is dry-milled in the presence of 0.1 to 1.0% by weight of acetic anhydride prior to the slip formation, whereby the magnesium oxide is protected from the action of carbon dioxide, and
    (b) said slip contains an aqueous solution of citrate anion, said solution containing said anion in an amount equivalent to 0.1 to 10% by weight of the magnesium compound of the anion.

12. In a process for making magnesium oxide refractory articles wherein a magnesium oxide slip is formed from ground magnesium oxide, cast in a porous mold, extracted from the mold, and subsequently fired, the improvement wherein
  (a) said magnesium oxide is dry-milled in the presence of 0.1 to 1.0% by weight of acetic anhydride prior to the slip formation, whereby the magnesium oxide is protected from the action of carbon dioxide, and
  (b) said slip contains an aqueous solution of phthalate anion, said solution containing said anion in an amount equivalent to 0.1 to 10% by weight of the magnesium compound of the anion.

13. In a process for making magnesium oxide refractory articles wherein the magnesium oxide slip is formed from ground magnesium oxide, cast in a porous mold, extracted from the mold, and subsequently fired, the improvement wherein
  (a) said magnesium oxide is dry-milled in the presence of 0.1 to 1.0% by weight of acetic anhydride prior to the slip formation, whereby the magnesium oxide is protected from the action of carbon dioxide, and
  (b) said slip contains an aqueous solution of tartrate anion, said solution containing said anion in an amount equivalent to 0.1 to 10% by weight of the magnesium compound of the anion.

14. In a process for making magnesium oxide refractory articles wherein a magnesium oxide slip is formed from ground magnesium oxide, cast in a porous mold, extracted from the mold, and subsequently fired, the improvement wherein
  (a) said magnesium oxide is treated with acetic anhydride prior to the slip formation, whereby the magnesium oxide is protected from the action of carbon dioxide,
  (b) said slip contains an aqueous solution of an anion of a polybasic organic acid, said solution containing said anion in an amount equivalent to 0.1 to 10% by weight of the magnesium compound of the anion, and
  (c) said slip contains 60 to 85% by weight magnesium oxide and has a viscosity of maximally 2000 centipoises.

15. In a proces for making magnesium oxide refractory articles wherein a magnesium oxide slip is formed from ground magnesium oxide, cast in a porous mold, extracted from the mold, and subsequently fired, the improvement wherein
  (a) said magnesium oxide is maintained in a substantially carbon dioxide-free zone prior to the slip formation, whereby the magnesium oxide is protected from the action of carbon dioxide,
  (b) said slip contains an aqueous solution of an anion of a polybasic organic acid, said solution containing said anion in an amount equivalent to 0.1 to 10% by weight of the magnesium compound of the anion, and
  (c) said slip contains 60 to 85% by weight magnesium oxide and has a viscosity of maximally 2000 centipoises.

References Cited in the file of this patent

UNITED STATES PATENTS

| | | |
|---|---|---|
| 2,579,886 | Vettel | Dec. 25, 1951 |
| 2,636,244 | Williams | Apr. 28, 1953 |
| 2,902,380 | Allison | Sept. 1, 1959 |

OTHER REFERENCES

Richardson, H. K.: Small Cast Thorium Oxide Crucibles in Jour. Amer. Cer. Soc. 18(2), pages 65–69 (1935).

Verdieck, R. G.: Foote Note on Lithium Clay Dispersions. In Foote Prints 22(1) pages 17–19 (1950).

St. Pierre, P. D. S.: Slip Casting Thorium Dioxide, in Bull. Amer. Cer. Soc. 34 (7) pages 231–232 (1955).

Mayer, et al.: J. Prakt. Chem., 11, pages 327–35 (1960) (cited from Chem. Abstr., vol. 55, column 10298b May 61 QD 1A51).